UNITED STATES PATENT OFFICE.

OTTO GRAUL, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PRODUCING 2.3-DIHALOGEN-2-METHYLBUTANE AND HOMOLOGUES THEREOF.

1,102,654.     Specification of Letters Patent.     Patented July 7, 1914.

No Drawing.     Application filed September 5, 1912. Serial No. 718,714.

*To all whom it may concern:*

Be it known that I, OTTO GRAUL, subject of the Duke of Anhalt, residing at Ludwigshafen-on-the-Rhine, Germany, have invented new and useful Improvements in Producing 2.3-Dihalogen-2-Methylbutane and Homologues Thereof, of which the following is a specification.

I have found that 2.3-dihalogen-2-methyl-butane, or homologues thereof, can be obtained by treating, with chlorin, 2-halogen-2-methyl-butane, or the corresponding homologue thereof, such for instance as the tertiary monochlor derivatives of isobutane, isohexane and isoheptane, while in the state of vapor, and preferably while energetically mixing. If desired, the reaction can be carried out in the presence of a chlorin carrier, or actinic rays, or electrical discharges can be employed. The invention gives rise to practically homogeneous products. In order to avoid the splitting off of hydrochloric acid, which is apt to take place, in the case of hydrocarbons of greater molecular weight, it is often advantageous to carry out the reaction under reduced pressure. Instead of chlorin, compounds which give rise to chlorin, such for instance as sulfuryl chlorid, can be employed.

2.3-dichlor-2-methyl-pentane is a new product and I claim it as such in this application.

The following examples will serve to illustrate further the nature of this invention and how it can be carried into practical effect, but the invention is not confined to these examples. The parts are by weight.

Example 1: Vaporize 2-chlor-2-methyl-butane in a suitable reaction vessel provided with a reflux condenser and a stirrer and with means for applying heat to about 100° C., and which should be so arranged that the dichlorid formed can continuously flow away. Pass a current of chlorin gas into the vapor and stir in such a manner that the vapor and gas are energetically mixed and the chlorin is immediately distributed through the space containing the vapor and always meets an excess of isoamyl chlorid. The dichlorid obtained can be fractionally distilled and boils at about 60° C. at a pressure of 60 millimeters. In a similar manner isoamyl bromid can be monochlorinated.

Example 2: Heat, to boiling point, 1200 parts of tertiary chlor-isohexane (obtainable from petroleum hexane of a boiling point of 62° C.) in an apparatus provided with a condenser, and placed under reduced pressure. Then gradually mix about 700 parts of chlorin with the vaporized chlor-isohexane at a pressure of about 60 millimeters, the chlorination takes place at about 60° C. and an excellent yield of 2.3-dichlor-2-methyl-pentane

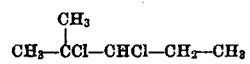

is obtained.

If desired, in either of the foregoing Examples 1 and 2, the reaction can be accelerated by chemically active rays, or by electric discharges, for instance an ultra-violet lamp can be inserted in the vessel in which the vapor and gas are mixed, or the gas mixture can be passed through tubes in which silent electric discharges are taking place.

Example 3: Raise 92.5 parts of tertiary chlor-isobutane to boiling point in a lead-lined vessel and allow the vapor to pass through a fractionating column into a vessel provided with a stirrer and gradually add 70 parts of chlorin, preferably in such a manner that the isochlorbutane is always in excess. Then subject the mixture to the light of an ultraviolet lamp, which can be done, if desired, in the mixing vessel, or pass the said mixture through a series of tubes in which silent electric discharges are being generated. The reaction product together with any unaltered monochlor-isobutane is then condensed and caused to flow back into the lead-lined vessel. The hydrochloric acid is condensed with water. The fractionating column is maintained at such a temperature that the dichlor-isobutane is condensed and flows back into the said lead-lined vessel and is thus not subjected to the action of chlorin a second time. In this way a good yield of dichlor-isobutane of boiling point 108° to 109° C. is obtained.

Now what I claim is:—

1. The process of producing a dihalogen hydrocarbon of the homologous series of which 2.3-dihalogen-2-methyl-butane is a member and which contains at least four carbon atoms, by treating with chlorin a vaporized monohalogen hydrocarbon of the homologous series of which 2-halogen-2- methyl-butane is a member and which contains at least four carbon atoms.

2. The process of producing a dihalogen hydrocarbon of the homologous series of which 2.3-dihalogen-2-methyl-butane is a member and which contains at least four carbon atoms, by treating with chlorin a vaporized monohalogen hydrocarbon of the homologous series of which 2-halogen-2-methyl-butane is a member and which contains at least four carbon atoms, while carrying out the treatment under reduced pressure.

3. The process of producing a dihalogen hydrocarbon of the homologous series of which 2.3-dihalogen-2-methyl-butane is a member and which contains at least four carbon atoms, by treating with chlorin a vaporized monohalogen hydrocarbon of the homologous series of which 2-halogen-2-methyl-butane is a member and which contains at least four carbon atoms while well mixing the gases.

4. The process of producing a dihalogen hydrocarbon of the homologous series of which 2.3-dihalogen-2-methyl-butane is a member and which contains at least four carbon atoms, by treating with chlorin a vaporized monohalogen hydrocarbon of the homologous series of which 2-halogen-2-methyl-butane is a member and which contains at least four carbon atoms while well stirring and subjecting the mixture to the action of actinic rays.

5. The process of producing a dihalogen hydrocarbon of the homologous series of which 2.3-dihalogen-2-methyl-butane is a member and which contains at least four carbon atoms, by treating with chlorin a vaporized monohalogen hydrocarbon of the homologous series of which 2-halogen-2-methyl-butane is a member and which contains at least four carbon atoms, then removing the dihalogenated product from the monohalogenated product and subjecting the monohalogenated product in the form of vapor again to the action of chlorin.

6. As a new article of manufacture 2.3-dichlor-2-methyl-pentane possessing a constitution corresponding to the formula

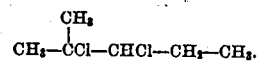

In testimony whereof I have hereunto set my hand in the presence of two subscribing witnesses.

OTTO GRAUL.

Witnesses:
J. ALEC. LLOYD,
JOSEPH PFEIFFER.